(12) United States Patent
Mironets et al.

(10) Patent No.: US 9,988,721 B2
(45) Date of Patent: Jun. 5, 2018

(54) ADDITIVE MANUFACTURING PROCESSING WITH OXIDATION

(71) Applicant: Delavan Inc, West Des Moines, IA (US)

(72) Inventors: Sergey Mironets, Charlotte, NC (US); William L. Wentland, Rockford, IL (US); Matthew Donovan, Ankeny, IA (US); Thomas J. Ocken, Des Moines, IA (US); Robert Bianco, Strongsville, OH (US)

(73) Assignee: Delavan, Inc., West Des Moines, IA (US)

( * ) Notice: Subject to any disclaimer, the term of this patent is extended or adjusted under 35 U.S.C. 154(b) by 0 days. days.

(21) Appl. No.: 15/195,210

(22) Filed: Jun. 28, 2016

(65) Prior Publication Data
US 2017/0370005 A1 Dec. 28, 2017

(51) Int. Cl.
*C23C 22/82* (2006.01)
*B33Y 40/00* (2015.01)

(52) U.S. Cl.
CPC .............. *C23C 22/82* (2013.01); *B33Y 40/00* (2014.12)

(58) Field of Classification Search
None
See application file for complete search history.

(56) References Cited

U.S. PATENT DOCUMENTS

| | | | | |
|---|---|---|---|---|
| 6,573,405 | B1* | 6/2003 | Abbott | C07B 37/04 564/292 |
| 2004/0071862 | A1* | 4/2004 | White | B22F 3/004 427/8 |
| 2004/0137158 | A1* | 7/2004 | Kools | C23C 14/5826 427/404 |
| 2012/0329659 | A1* | 12/2012 | Holcomb | B22F 3/00 505/400 |
| 2013/0101728 | A1* | 4/2013 | Keremes | B22F 3/1055 427/8 |
| 2013/0287934 | A1* | 10/2013 | Ramsundar | B05D 1/38 427/9 |
| 2014/0034626 | A1* | 2/2014 | Illston | B29C 67/0077 219/121.78 |
| 2014/0083651 | A1* | 3/2014 | Chaix | F28D 15/02 165/104.21 |
| 2014/0140859 | A1* | 5/2014 | Bales | F01D 5/28 416/96 R |
| 2015/0144496 | A1* | 5/2015 | Morris | F01D 5/186 205/261 |
| 2015/0259790 | A1* | 9/2015 | Newman | C23C 16/27 423/446 |
| 2015/0321250 | A1* | 11/2015 | Xu | B23P 6/005 164/15 |
| 2015/0322799 | A1* | 11/2015 | Xu | F01D 5/18 416/231 R |
| 2015/0375359 | A1 | 12/2015 | Cui et al. | |
| 2016/0067828 | A1 | 3/2016 | Liebl et al. | |
| 2016/0167172 | A1* | 6/2016 | Goncharov et al. | B23K 26/342 219/76.12 |
| 2016/0215629 | A1* | 7/2016 | Chouhan | F01D 5/28 |
| 2016/0271874 | A1* | 9/2016 | Tsai | B29C 67/0059 |
| 2016/0312627 | A1* | 10/2016 | Chen | F01D 5/288 |
| 2016/0339516 | A1* | 11/2016 | Xu | B22D 27/045 |
| 2017/0027624 | A1* | 2/2017 | Wilson | A61B 17/72 |
| 2017/0056975 | A1* | 3/2017 | Carter | B22F 5/009 |
| 2017/0057014 | A1* | 3/2017 | Illston | B33Y 10/00 |
| 2017/0136540 | A1* | 5/2017 | Dods | B22F 3/1055 |
| 2017/0144219 | A1* | 5/2017 | Xu | B22D 27/045 |

OTHER PUBLICATIONS

Andrew Abbott et al.; Voltametric and impedance studies of the electropolishing of type 316 stainless steel in a choline chloride based ionic liquid; Electrochimica Acta, vol. 51, pp. 4420-4425; publication year 2006.*
Jakob Knabel, ASTM and ISO publish new Standard Terminology for Additive Manufacturing Technologies—ISO/ASTM 52900:2015; Jan 15, 2016; From 3Printr.com https://www.3printr.com/astm-standard-terminology-for-additive-manufacturing-technologies-withdrawn-5133486/.*
https://www.iso.org/obp/ui/#iso:std:69669:en; ISO/ASTM 52900:2015(en) Additive manufacturing—General principles—Terminology; 2015 ISO/ASTM.*

* cited by examiner

Primary Examiner — Allan Olsen
(74) Attorney, Agent, or Firm — Locke Lord LLP; Daniel J. Fiorello; Scott D. Wofsy

(57) ABSTRACT

A method includes additively manufacturing an article in an inert environment, removing the article from the inert environment and placing the article in a non-inert environment, allowing at least a portion the article to oxidize in the non-inert environment to form an oxidized layer on a surface of the article, and removing the oxidized layer (e.g., to smooth the surface of the article). The method can further include relieving stress in the article (e.g., via heating the article after additive manufacturing).

18 Claims, 1 Drawing Sheet

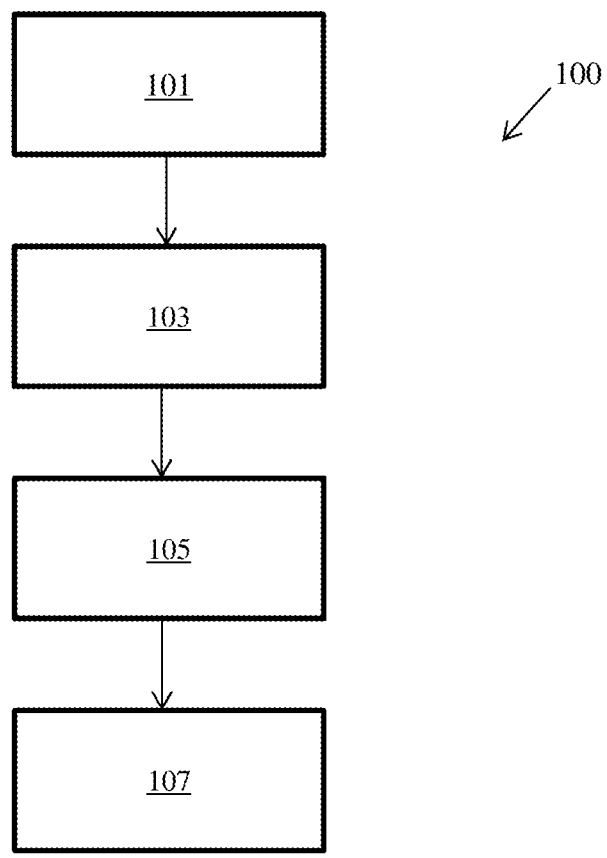

ADDITIVE MANUFACTURING PROCESSING WITH OXIDATION

BACKGROUND

1. Field

The present disclosure relates to additive manufacturing, more specifically to additive manufacturing with oxidation.

2. Description of Related Art

Many traditionally additively manufactured articles include a poor surface finish. For example, in laser sintering methods, partially melted and solid state sintered satellite particles attached to the part surface serve as stress raisers that adversely affect functional properties and structural fatigue life. For example, additively manufactured thin walled structures (e.g., heat exchangers with thin fins) with poor surface finish can have an excessive pressure drop which often counterweighs the thermal efficiency gain. Straight or curved thin walled structures operating at elevated temperatures can be susceptible to internal oxidation/hot corrosion that can penetrate into the subsurface interconnected porosity and eventually destroy thin walled structures.

Therefore, the structural integrity, thermal performance, and/or other characteristics of certain additively built thin walled devices can be a function of the surface finish quality. The majority of the existing mechanical and chemical surface finishing methods can have downsides to achieving the required surface finish of additively manufactured articles (e.g., heat exchangers with closely packed fins). For example, mass finishing techniques involving abrasive media do not provide a uniform material removal rate (e.g., which can cause wear on fin edges of a heat exchanger).

The electrochemical polishing techniques involving aqueous solutions such as nitric, phosphoric and sulfuric acids, potassium hydroxide and others can cause significant morphological changes at the material surface. That can lead to intergranular attack and oxidation that compromises material integrity.

Such conventional methods and systems have generally been considered satisfactory for their intended purpose. However, there is still a need in the art for an industrial technique for removing surface asperities and improving surface finish of additively manufactured components that would provide fast and uniform material removal rate without impacting the material properties, for example. The present disclosure provides a solution for this need.

SUMMARY

A method includes additively manufacturing an article in an inert environment, removing the article from the inert environment and placing the article in a non-inert environment, allowing at least a portion the article to oxidize in the non-inert environment to form an oxidized layer on a surface of the article, and removing the oxidized layer (e.g., to smooth the surface of the article). The method can further include relieving stress in the article (e.g., via heating the article after additive manufacturing).

Additively manufacturing the article can include laser sintering the article. Laser sintering the article can include laser sintering a Nickel alloy powder or any other suitable powder (e.g., iron alloys, titanium alloys, cobalt alloys, etc.).

Allowing at least a portion of the article to oxidize can be done while heating the article, for example. In certain embodiments, the method can include masking a portion of the article to prevent oxidation of the masked portion before allowing at least a portion of the article to oxidize.

Allowing at least a portion of the article to oxidize can include controlling at least one of a humidity, air quality, or temperature to control oxidation rate and/or oxidation layer thickness. Placing the article in a non-inert environment can include placing the article in at least one of a nitriding environment, a carburizing environment, a sulfurizing environment, a boriding environment, a chloriding environment, or a fluoriding environment. In certain embodiments, allowing at least a portion of the article to oxidize can include preferentially oxidizing a portion of the article by introducing circulation of humidity or oxidizing gas around the article or through a passage of the article to achieve a predetermined oxidation rate or a predetermined oxidation layer thickness.

Removing the oxidized layer can include treating the oxidized layer with an ionic liquid. Treating the oxidized layer with an ionic liquid can include treating the oxidized layer with choline chloride. In certain embodiments, treating the oxidized layer with an ionic liquid includes electropolishing to descale the oxidized layer.

In certain embodiments, the method can include solution heat treating the article before removing the oxidation layer. Solution heat treating the article can include heating the article in an air furnace. In certain embodiments, solution heat treating includes quenching the article in water after heating the article in an air furnace.

The method can include passivating the surface of the article after removing the oxidation layer. In certain embodiments, the method can include any suitable post processing (e.g., heat treating) the article after removing the oxidize layer.

In accordance with at least one aspect of this disclosure, a method of modifying an additively manufactured article includes forming an oxidation layer on portions of the additively manufactured article, and removing the oxidation layer. The method can include relieving stress in the additively manufactured article.

The method can include improving surface finish on surfaces of the portions of the additively manufactured article. The method can include reducing porosity of the portions of the additively manufactured article.

In certain embodiments, the method can include forming a uniform thickness of the oxidation layer. The method can include removing material on the portions of the additively manufactured article. In certain embodiments, the method can include forming the oxidation layer with a gas.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 1 is a flow diagram of an embodiment of a method in accordance with this disclosure.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a method in accordance with the disclosure is shown in FIG. 1 and is designated generally by reference character 100. The systems and methods described herein can be used to provide improved processing of additively manufactured articles.

Referring to FIG. 1, a method 100 includes additively manufacturing (e.g., at block 101) an article in an inert environment. Additively manufacturing (e.g., at block 101) the article can include laser sintering the article. Laser sintering the article can include laser sintering a Nickel alloy powder. Any other suitable form of additive manufacturing and/or material selection is contemplated herein (e.g., using iron alloys, titanium alloys, cobalt alloys, etc.).

The method 100 also includes removing the article from the inert environment and placing the article in a non-inert environment (e.g., at block 103). Placing the article in a non-inert environment can include placing the article in a nitriding environment and/or a carburizing environment. Any suitable environment (e.g., an oxygen rich environment, air, sulfurizing, boriding, chloriding, fluoriding, etc.) is contemplated herein.

The method also includes allowing at least a portion the article to oxidize (e.g., at block 105) in the non-inert environment to form an oxidized layer on a surface of the article. The method can further include heating the article for stress relief after additive manufacturing.

Allowing at least a portion of the article to oxidize (e.g., at block 105) can be done while heating the article for stress relief, for example. Stress relief can include, e.g., putting a build plate with the additively manufactured article in air furnace, heating to relieve internal stress, and then cooling the article. In certain embodiments, moisture, carbon monoxide, and/or any other suitable fluid can be added to the processing atmosphere to build up a desired oxidation layer with a purpose to fill surface porosity without extending too deep into the structure of the article. Any other suitable stage of additive manufacturing (e.g., post processing) is contemplated herein for allowing oxidation of at least the portion of the article.

Allowing at least a portion of the article to oxidize (e.g., at block 105) can include controlling at least one of a humidity, air quality, or temperature to control oxidation rate and/or oxidation layer thickness. In certain embodiments, the method can include masking a portion of the article to prevent oxidation of the masked portion before allowing at least a portion of the article to oxidize. In certain embodiments, allowing at least a portion of the article to oxidize (e.g., at block 105) can include preferentially oxidizing a portion of the article by introducing circulation of humidity or oxidizing gas around the article or through a passage of the article to achieve a predetermined oxidation rate or a predetermined oxidation layer thickness.

The method further includes removing the oxidized layer (e.g., at block 107) to smooth the surface of the article. Removing the oxidized layer (e.g., at block 107) can include treating the oxidized layer with an ionic liquid. Treating the oxidized layer with an ionic liquid can include treating the oxidized layer with choline chloride, for example. One or more molten salts could also be used to remove the oxidized layer.

In certain embodiments, treating the oxidized layer with an ionic liquid includes electro-polishing to descale the oxidized layer. Any other suitable treating solutions and/or polishing techniques to remove the oxidized layer are contemplated herein.

In certain embodiments, the method can include solution heat treating the article before removing the oxidation layer. Solution heat treating the article can include heating the article in an air furnace. In certain embodiments, solution heat treating includes quenching the article in water after heating the article in an air furnace. Having the oxidation layer can protect the article during solution heat treating to gain the benefits thereof, and then be removed to smooth the article.

The method can include passivating the surface of the article after removing the oxidation layer. In certain embodiments, the method can include any suitable post processing (e.g., heat treating) the article after removing the oxidize layer.

As described above, an additively manufactured article is purposely oxidized and then descaled (e.g., with less aggressive methods than previously used which is beneficial for thin walled articles, for example). To account for removed material, the model to be additively manufactured can be designed to have extra thickness (e.g., from about 25 to about 500 microns) where oxidation is desired to account for ultimately removed material. Then the article can be additively manufactured intentionally thicker, e.g., such that channels in a plate fin heat exchanger are initially smaller (e.g., from about 25 to about 1000).

Embodiments as described above can be applied to a wide variety of components that require surface roughness improvements. Examples may include densely packed fin exchangers, critical fuel delivery components such as fuel nozzles, parts with complex internal channels or conformal cooling passages, etc.

By performing thermal treatment in an unprotected atmosphere, an oxidation layer with predetermined depth of penetration (e.g., with uniformity or otherwise) can be achieved. In certain embodiments, the oxidation layer thickness can extend to and/or beyond subsurface porosity. The subsurface porosity can be localized within 150-200 microns layer depth from the surface in certain cases (e.g., at least for nickel alloys).

The existing ionic liquids (such as choline chloride or equivalent, for example) are effective in removing Ni-based surface scale (e.g., for high pressure turbine blades and vanes). Such solutions provide homogeneous dissolution of oxidized metal and enables visualization of grain structure on polished surfaces (knowing structure is beneficial for production quality assurance).

As described above, creating surface oxidation layer can be achieved not only during the stress relieve operation, but during solution and precipitation ageing heat treatment operations, for example, or at any other suitable time. A surface oxidation layer after stress relief may be beneficial for sealing the subsurface porosity that is important for healing all internal defects during HIP processing. Also, having a protective oxidized layer covered the entire part surface can safely allow performing solution heat treatment in an air furnace and enable quenching in water. Fast cooling rates achieved during the water quenching can be beneficial for improving microstructure of precipitation hardening alloys.

Some advantages to certain embodiments disclosed above include surface roughness improvement of additively manufactured parts with complex shape internal passages, significant time and cost savings compared to mechanical surface improvement methods utilizing abrasive media, improved surface roughness quality and material integrity compared to the existing aqueous electrochemical polishing techniques, and/or improved microstructure/properties as a result of fast cooling rate during water quenching after solution heat treatment.

The methods and systems of the present disclosure, as described above and shown in the drawings, provide for additive manufacturing methods with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A method, comprising:
    additively manufacturing an article in an inert environment;
    removing the article from the inert environment and placing the article in a non-inert environment;
    allowing at least a portion the article to oxidize in the non-inert environment to form an oxidized layer on a surface of the article; and,
    removing the oxidized layer;
    wherein allowing at least a portion of the article to oxidize includes controlling at least one of a humidity, air quality, or temperature to control oxidation rate and/or oxidation layer thickness.

2. The method of claim 1, wherein removing the oxidized layer smooths the surface of the article.

3. The method of claim 1, further comprising relieving stress in the article.

4. The article of claim 3, wherein relieving stress includes heating the article after additive manufacturing.

5. The method of claim 4, wherein allowing at least a portion of the article to oxidize is done while heating the article.

6. The method of claim 1, wherein allowing at least a portion of the article to oxidize includes preferentially oxidizing a portion of the article by introducing circulation of humidity or oxidizing gas around the article or through a passage of the article to achieve a predetermined oxidation rate or a predetermined oxidation layer thickness.

7. The method of claim 1, wherein placing the article in a non-inert environment includes placing the article in at least one of a nitriding environment, a carburizing environment, a sulfurizing environment, a boriding environment, a chloriding environment, or a fluoriding environment.

8. The method of claim 1, wherein removing the oxidized layer includes treating the oxidized layer with an ionic liquid.

9. The method of claim 8, wherein treating the oxidized layer with an ionic liquid includes treating the oxidized layer with choline chloride.

10. The method of claim 8, wherein treating the oxidized layer with an ionic liquid includes electro-polishing to descale the oxidized layer.

11. The method of claim 1, further comprising passivating the surface of the article after removing the oxidation layer.

12. The method of claim 1, further comprising post processing the article after removing the oxidize layer.

13. A method of modifying an additively manufactured article, comprising: forming an oxidation layer to a predetermined uniform thickness upon portions of the additively manufactured article; and removing the oxidation layer.

14. The method of claim 13, further comprising relieving stress in the additively manufactured article.

15. The method of claim 13, further comprising improving surface finish on surfaces of the portions of the additively manufactured article.

16. The method of claim 13, further comprising reducing porosity of the portions of the additively manufactured article.

17. The method of claim 13, further comprising removing material on the portions of the additively manufactured article.

18. A method, comprising:
    additively manufacturing an article in an inert environment;
    masking a portion of the article to prevent oxidation of the masked portion;
    removing the article from the inert environment and placing the article in a non-inert environment;
    allowing at least a portion the article to oxidize in the non-inert environment to form an oxidized layer on a surface of the article; and,
    removing the oxidized layer.

* * * * *